`US010497380B2`

(12) United States Patent
Matsumoto et al.

(10) Patent No.: US 10,497,380 B2
(45) Date of Patent: Dec. 3, 2019

(54) MEDIUM FOR VOICE SIGNAL PROCESSING PROGRAM, VOICE SIGNAL PROCESSING METHOD, AND VOICE SIGNAL PROCESSING DEVICE

(71) Applicant: FUJITSU LIMITED, Kawasaki-shi, Kanagawa (JP)

(72) Inventors: Chikako Matsumoto, Yokohama (JP); Naoshi Matsuo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 138 days.

(21) Appl. No.: 15/681,777

(22) Filed: Aug. 21, 2017

(65) Prior Publication Data

US 2018/0082701 A1    Mar. 22, 2018

(30) Foreign Application Priority Data

Sep. 16, 2016  (JP) .................................. 2016-181930

(51) Int. Cl.
| | | |
|---|---|---|
| *G10L 21/00* | (2013.01) | |
| *G10L 21/0216* | (2013.01) | |
| *G10L 21/0208* | (2013.01) | |
| *G10L 25/06* | (2013.01) | |
| *G10L 15/02* | (2006.01) | |
| *G10L 15/20* | (2006.01) | |

(52) U.S. Cl.
CPC ...... *G10L 21/0216* (2013.01); *G10L 21/0208* (2013.01); *G10L 25/06* (2013.01); *G10L 15/02* (2013.01); *G10L 15/20* (2013.01); *G10L 2021/02166* (2013.01)

(58) Field of Classification Search
CPC combination set(s) only.
See application file for complete search history.

(56) References Cited

U.S. PATENT DOCUMENTS

| | | |
|---|---|---|
| 2007/0274536 A1 | 11/2007 | Matsuo |
| 2012/0179458 A1 | 7/2012 | Oh et al. |
| 2013/0166286 A1 | 6/2013 | Matsumoto |

FOREIGN PATENT DOCUMENTS

| | | |
|---|---|---|
| EP | 2 851 898 A1 | 3/2015 |
| JP | 2007-318528 | 12/2007 |
| WO | WO 2012/061145 A1 | 5/2012 |

*Primary Examiner* — Vu B Hang
(74) *Attorney, Agent, or Firm* — Staas & Halsey LLP

(57) ABSTRACT

A voice signal processing method includes: converting a first and a second voice signals to a first and a second frequency signals; setting a coefficient of existence representing degree of existence of a target sound and a coefficient of non-existence representing degree of existence of a non-target sound based on a phase difference for each of the predetermined frequencies between the first and the second frequency signals and a target sound existence region indicating an existence position of the target sound; and judging whether the first voice and/or the second voice include the target sound, based on the coefficient of existence, the coefficient of non-existence and a representative value corresponding to either one of the first and the second frequency signals.

15 Claims, 16 Drawing Sheets

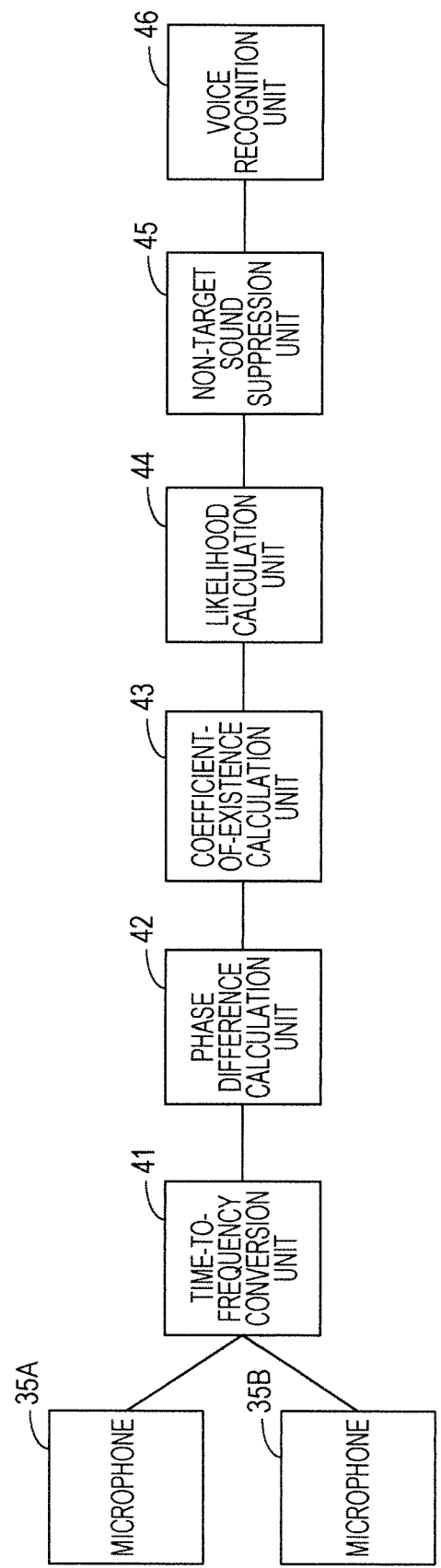

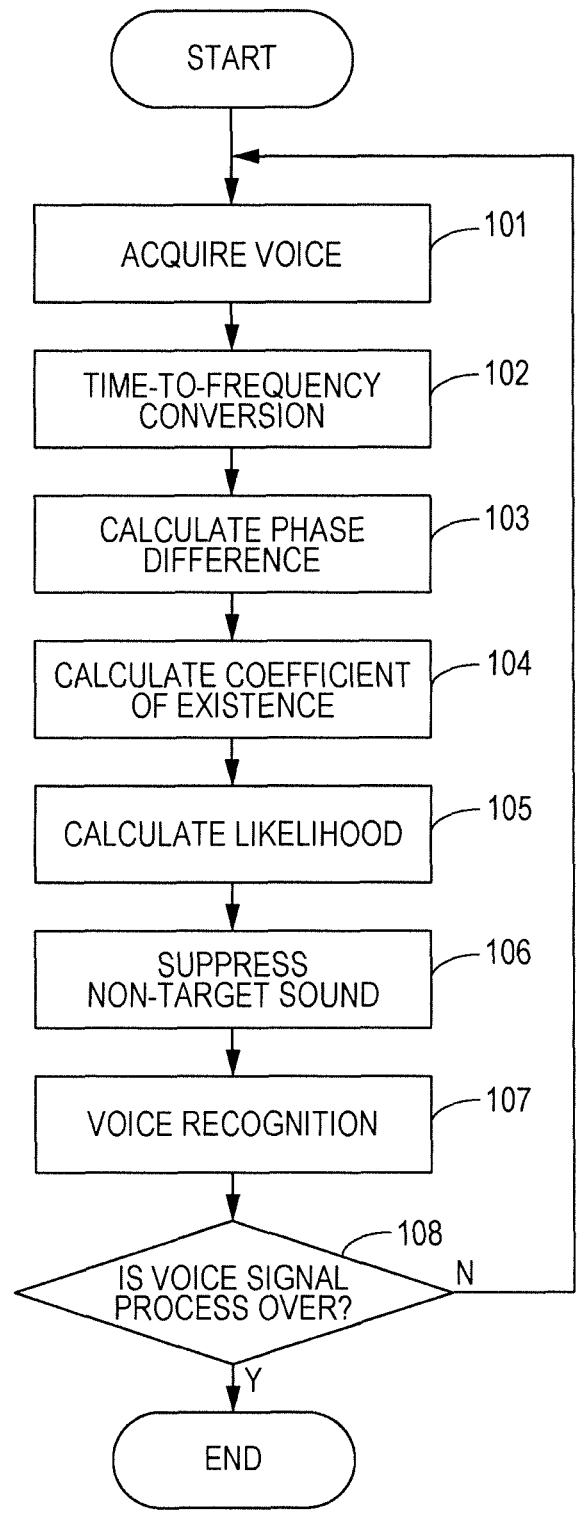

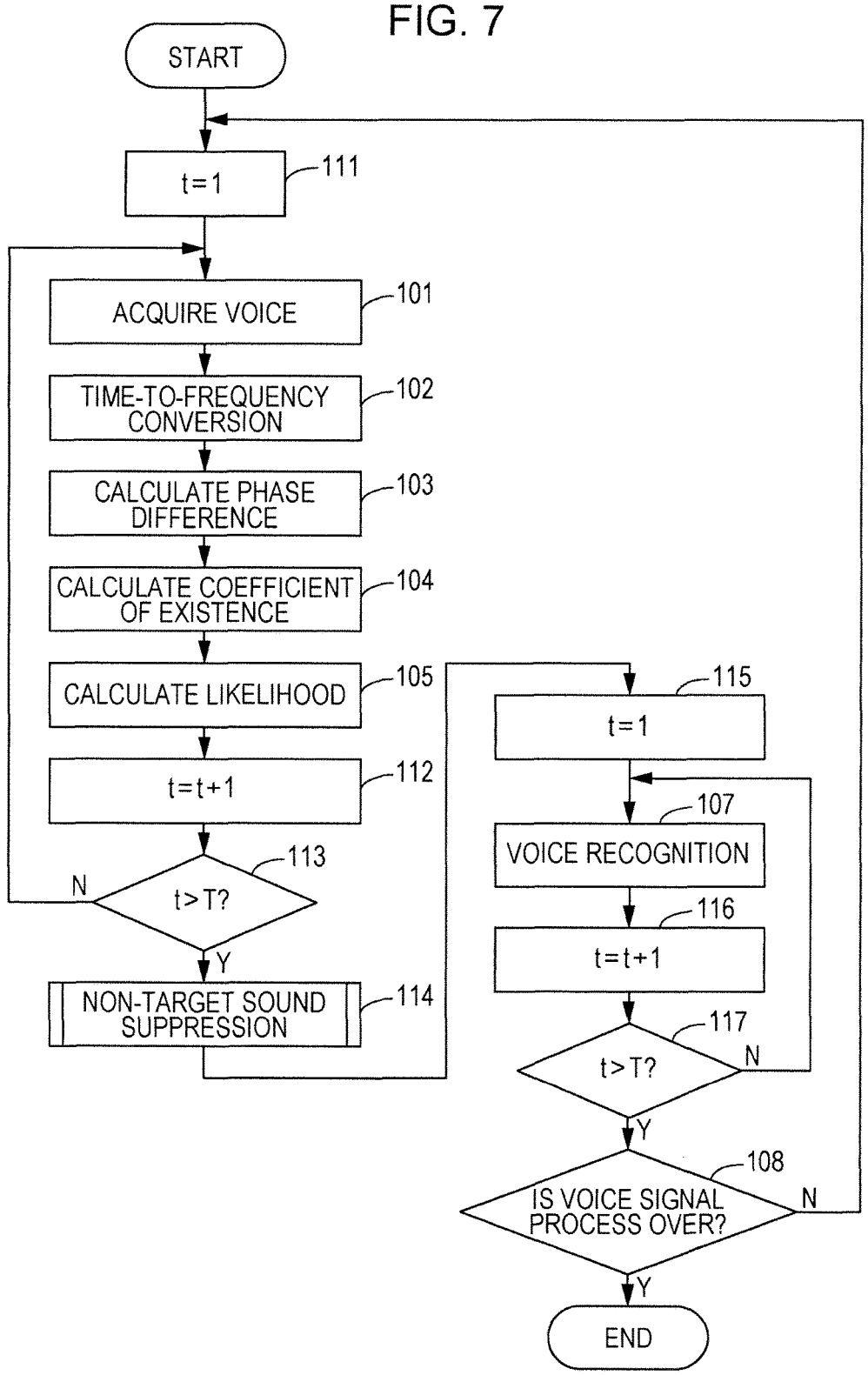

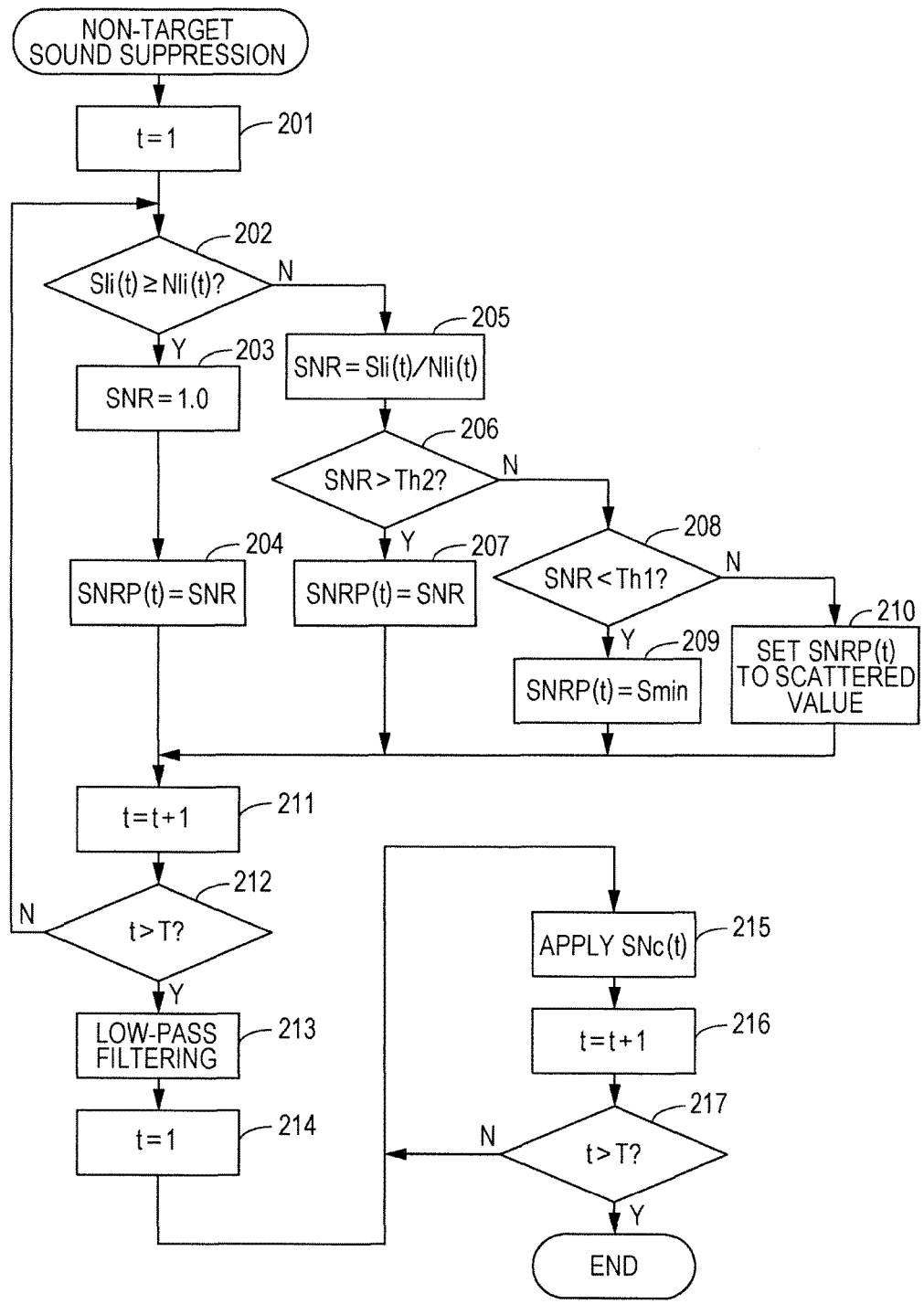

|  | RA | PA |
|---|---|---|
| TARGET SOUND ALONE | 93.5% | 93.5% |
| TARGET SOUND +NON-TARGET SOUND | 83.9% | 91.5% |

|  | RA | PA |
|---|---|---|
| TARGET SOUND ALONE | 0.0% | 0.0% |
| TARGET SOUND +NON-TARGET SOUND | 16.4% | 0.0% |
| NON-TARGET SOUND ALONE | 52.5% | 1.6% |

MEDIUM FOR VOICE SIGNAL PROCESSING PROGRAM, VOICE SIGNAL PROCESSING METHOD, AND VOICE SIGNAL PROCESSING DEVICE

CROSS-REFERENCE TO RELATED APPLICATION

This application is based upon and claims the benefit of priority of the prior Japanese Patent Application No. 2016-181930, filed on Sep. 16, 2016, the entire contents of which are incorporated herein by reference.

FIELD

The embodiments discussed herein are related to a medium for a voice signal processing program, a voice signal processing method, and a voice signal processing device.

BACKGROUND

For example, when various devices of an automobile are to be operated by voice of a driver, it is difficult to operate the various devices as intended unless a voice of the driver which is a target sound is appropriately distinguished from a radio voice or the like flowing in the vehicle which is a non-target sound. To extract a target sound under an environment where a non-target sound may exist together with the target sound, there is available a technique using a phase difference between voice signals accepted by a plurality of microphones. The technique calculates a phase difference between voices accepted by a plurality of microphones, identifies a probability value indicating the probability of existence of a target sound existence position based on the calculated phase difference, and suppresses a non-target sound using the identified probability value. Japanese Laid-open Patent Publication No. 2007-318528 is an example of related art.

In a narrow place, such as an automobile interior, however, voice reflects. It is difficult to distinguish between a target sound and a non-target sound based on a phase difference under the influence of the reflection.

The present disclosure appropriately judges a target sound under an environment where the target sound and a non-target sound may be co-resident.

SUMMARY

According to an aspect of the invention, a voice signal processing method includes: converting a first and a second voice signals to a first and a second frequency signals; setting a coefficient of existence representing degree of existence of a target sound and a coefficient of non-existence representing degree of existence of a non-target sound based on a phase difference for each of the predetermined frequencies between the first and the second frequency signals and a target sound existence region indicating an existence position of the target sound; and judging whether the first voice and/or the second voice include the target sound, based on the coefficient of existence, the coefficient of non-existence and a representative value corresponding to either one of the first and the second frequency signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a conceptual diagram for explaining the outline of each of voice signal processes according to the first and second embodiments;

FIG. 5 is a flowchart depicting an example of the flow of the voice signal process according to the first embodiment;

FIG. 7 is a flowchart depicting an example of the flow of the voice signal process according to the second embodiment;

FIG. 8 is a flowchart depicting an example of the flow of a non-target sound suppression process according to the second embodiment;

DESCRIPTION OF EMBODIMENTS

Hereinafter, an example of a first embodiment will be described in detail with reference to the drawings.

Figure 1:
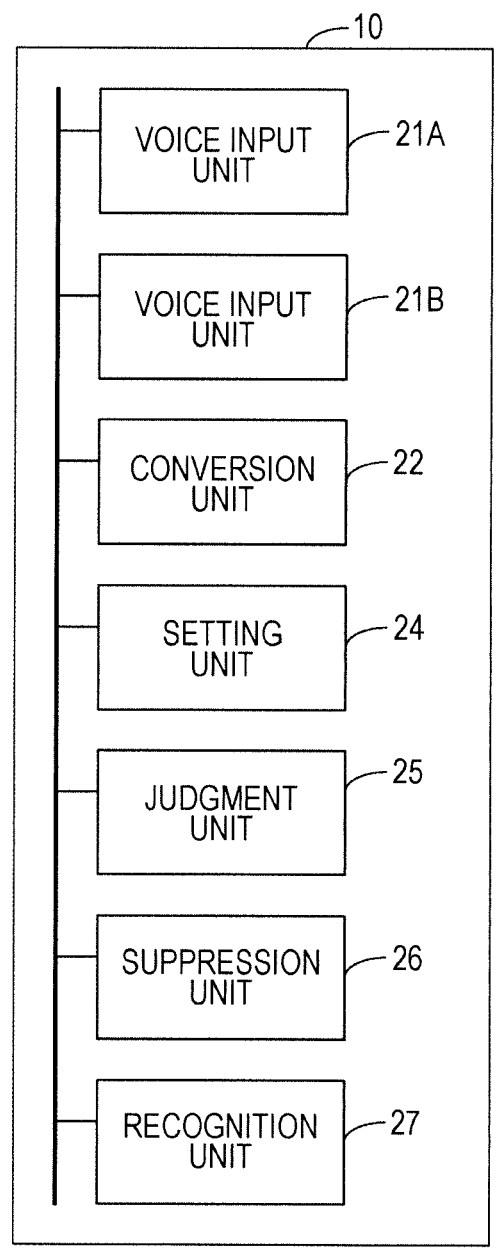
FIG. 1 is a block diagram depicting an example of main functions in each of voice signal processing devices according to first and second embodiments.

A voice signal processing device 10 depicted in FIG. 1 includes voice input units 21A and 21B, a conversion unit 22, a setting unit 24, a judgment unit 25, a suppression unit 26, and a recognition unit 27. The voice input unit 21A as an example of a first voice input unit and the voice input unit 21B as an example of a second voice input unit each accept input of a voice signal. A case where the number of voice input units is two will be described below. The present embodiment, however, is not limited to this, and three or more voice input units may be included.

The conversion unit 22 converts each voice signal from time-domain representation to frequency-domain representation through time-to-frequency conversion. For example, the conversion unit 22 converts a voice signal which varies in level with time to a frequency signal which varies in level with frequency using a Fourier transform. The setting unit 24 sets, for each of predetermined frequencies, a coefficient of existence representing the degree of existence of a target sound serving as an object to be detected and a coefficient of non-existence representing the degree of existence of a non-target sound other than a target sound. The coefficients of existence and the coefficients of non-existence are set based on a phase difference for each of the predetermined frequencies between frequency signals corresponding to voice signals accepted by the voice input units 21A and 21B and a target sound existence region indicating a target sound existence position (identified in advance).

The judgment unit 25 judges whether voice signals accepted by the voice input units 21A and 21B include a target sound, based on a first likelihood indicating the likelihood that a sound is a target sound and a second likelihood indicating the likelihood that a sound is a non-target sound. The first likelihood is determined based on an existence value based on a coefficient of existence and a representative value corresponding to at least one of frequency signals, and the second likelihood is determined based on a non-existence value based on a coefficient of non-existence and the representative value.

The suppression unit 26 suppresses a non-target sound by applying a coefficient of suppression to at least one of voice signals accepted by the voice input units 21A and 21B. If a first likelihood is not less than a second likelihood, a voice is judged as a target sound, and the coefficient of suppression is set so as not to suppress a voice signal. On the other hand, if the first likelihood is less than the second likelihood, the sound is judged as a non-target sound, and the coefficient of suppression is set so as to suppress a voice signal. The recognition unit 27 recognizes a piece of voice information, such as a word, which is included in at least one of voices accepted by the voice input units 21A and 21B by applying an existing voice recognition technique to a voice signal, to which a coefficient of suppression is already applied.

Figure 2:
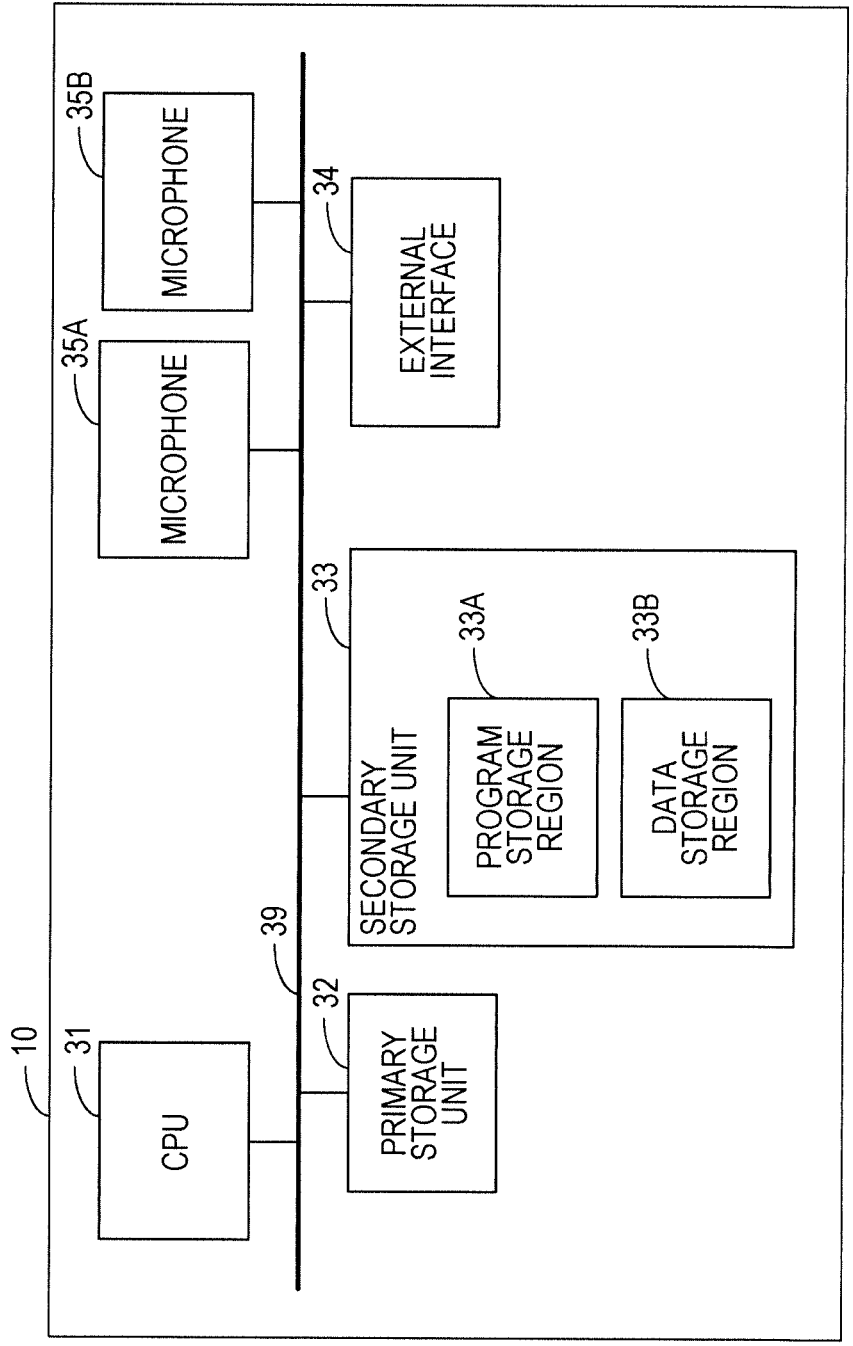
FIG. 2 is a block diagram depicting an example of the hardware configuration of each of the voice signal processing devices according to the first and second embodiments.

By way of example, the voice signal processing device 10 includes a central processing unit (CPU) 31, a primary storage unit 32, a secondary storage unit 33, an external interface 34, and two microphones 35A and 35B, as depicted in FIG. 2. The CPU 31 is an example of a processor which is a piece of hardware. The CPU 31, the primary storage unit 32, the secondary storage unit 33, the external interface 34, and the microphones 35A and 35B are connected to one another via a bus 39.

The primary storage unit 32 is, for example, a volatile memory, such as a random access memory (RAM). The secondary storage unit 33 is, for example, a nonvolatile memory, such as a hard disk drive (HDD) or a solid state drive (SSD).

The secondary storage unit 33 includes a program storage region 33A and a data storage region 33B. By way of example, the program storage region 33A stores a program, such as a voice signal processing program. By way of example, the data storage region 33B stores a voice signal, a piece of intermediate data which is generated during execution of the voice signal processing program, and the like.

The CPU 31 reads out the voice signal processing program from the program storage region 33A and loads the voice signal processing program onto the primary storage unit 32. The CPU 31 operates as the conversion unit 22, the setting unit 24, the judgment unit 25, the suppression unit 26, and the recognition unit 27 in FIG. 1 by executing the voice signal processing program.

Note that a program, such as the voice signal processing program, may be stored in an external server and be loaded onto the primary storage unit 32 over a network. A program, such as the voice signal processing program, may be stored in a non-transitory recording medium, such as a digital versatile disc (DVD), and be loaded onto the primary storage unit 32 via a recording medium reading device.

The microphones 35A and 35B are respective examples of the voice input units 21A and 21B and pick up a voice issued by a user which is an example of a target sound and a voice output from a radio or the like which is an example of a non-target sound and convert the voices to voice signals. The distance between the microphones 35A and 35B is such that respective voices picked up by the microphones 35A and 35B are not too different. Additionally, the distance is such that a phase difference between a voice picked up by the microphone 35A and a voice acquired by the microphone 35B is generated if the distance between the microphone 35A and a position where a voice is generated and the distance between the microphone 35B and the position where the voice is generated are different. Generation of a phase difference means that the phase difference is not 0. A position where a voice is generated may be a target sound or non-target sound existence position.

An external device is connected to the external interface 34. The external interface 34 controls transmission and reception of various types of information between the external device and the CPU 31. Although an example where the microphones 35A and 35B are included in the voice signal processing device 10 has been described, the microphones 35A and 35B may be external devices which are connected via the external interface 34.

Note that although the voice signal processing device 10 may be a dedicated device for voice signal processing, the present embodiment is not limited to this. For example, the voice signal processing device 10 may be a general-purpose device, such as a personal computer or a smartphone. Part or all of the voice signal processing device 10 may be a computer which is physically spaced apart from the microphones 35A and 35B and the like and is arranged, for example, over a network.

If a computer arranged over a network is adopted as the voice signal processing device 10, a voice signal processing program is stored in the computer. The microphones 35A and 35B acquire respective voice signals and transmit the acquired voice signals to the computer over the network. The computer performs a voice signal processing using the voice signals received over the network.

The outline of the action of the voice signal process will next be described. As depicted in FIG. 3, the microphones 35A and 35B pick up respective surrounding voices and convert the surrounding voices to voice signals INTA and INTB. The CPU 31 causes a time-to-frequency conversion unit 41 to convert each voice signal from time-domain representation to frequency-domain representation through time-to-frequency conversion. The time-to-frequency conversion unit 41 converts the voice signals that vary in level with time to frequency signals INFA and INFB which vary in level with frequency using, for example, Fourier transforms.

The CPU 31 causes a phase difference calculation unit 42 to calculate, for each of predetermined frequencies, a phase difference DP(f) which is a difference between a phase component of the frequency signal INFA and a phase component of the frequency signal INFB. f represents a frequency. The CPU 31 causes a coefficient-of-existence calculation unit 43 to calculate, for each of the predetermined frequencies, a coefficient Sco(f) of existence which represents the degree of existence of a target sound in the frequency signals INFA and INFB and a coefficient Nco(f) of non-existence which represents the degree of existence of a non-target sound. Note that the predetermined frequencies may be determined based on the frequency resolutions of the frequency signals INFA and INFB obtained through Fourier transforms.

Figure 4A:
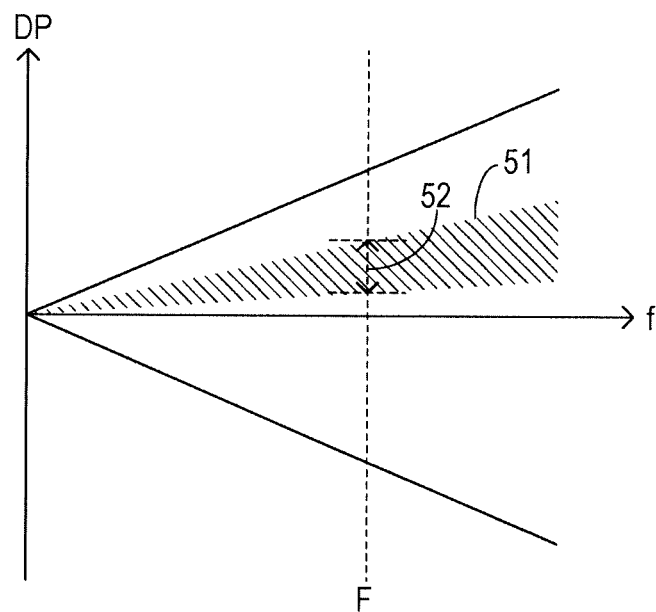
FIG. 4A is a conceptual chart illustrating a target sound existence region.

Calculation of a coefficient Sco(f) of existence and a coefficient Nco(f) of non-existence will be described below. FIG. 4A illustrates a target sound existence region 51 which is determined by a frequency and a phase difference between two frequency signals including a target sound. In FIG. 4A, the vertical axis represents a phase difference DP while the horizontal axis represents the frequency f. The target sound existence region 51 is determined from a target sound existence position and the positions of the microphones 35A and 35B. However, not only a target sound but also a non-target sound may exist in voices picked up by the microphones 35A and 35B. For this reason, the target sound existence region 51 has some width in a vertical axis direction representing a phase difference, as depicted in FIG. 4A. In the example in FIG. 4A, the distance between a target sound existence position and the microphone 35A and the distance between the target sound existence position and the microphone 35B are different, and the target sound existence region 51 exists above the horizontal axis representing that a phase difference is 0. A first line connecting the target sound existence position and a microphone array including the microphones 35A and 35B and a second line connecting a non-target sound existence position and the microphone array intersect. An angle at which the first and second lines intersect may be, for example, 30 degrees or an angle larger than 30 degrees. Note that two solid oblique lines in FIG. 4A indicate a theoretical value range where a phase difference is calculatable.

Figure 4B:
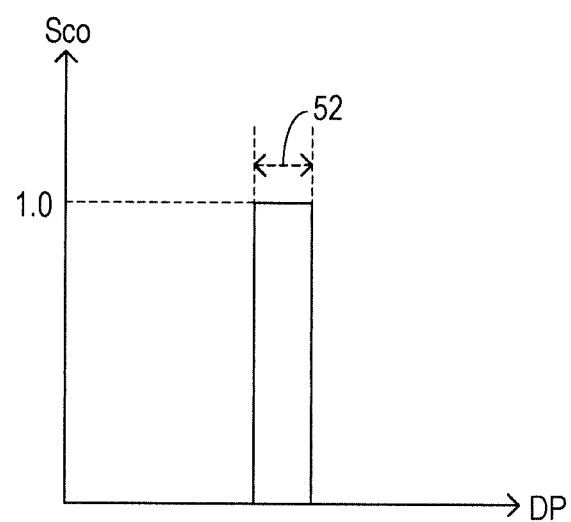
FIG. 4B is a conceptual chart illustrating setting of a coefficient of existence.

FIG. 4B illustrates setting of a coefficient of existence at a frequency F in FIG. 4A. That is, if a phase difference DP(F) which is calculated based on the frequency signals INFA and INFB exists within a phase difference width 52 which is an example of a first range at the frequency F, a coefficient Sco(F) of existence is set to 1.0, as illustrated by expression (1) below. If the phase difference DP(F) exists on the outside of the phase difference width 52 that is an example of a second range, the coefficient Sco(F) of existence is set to 0.0, as illustrated by expression (2).

$$Sco(F)=1.0 \text{(within the phase difference width 52)} \quad (1)$$

$$Sco(F)=0.0 \text{(outside of the phase difference width 52)} \quad (2)$$

That is, if the phase difference DP(F) calculated based on the frequency signals INFA and INFB exists within the target sound existence region 51 indicating a target sound existence position, the coefficient Sco(F) of existence is set to 1.0. On the other hand, if the phase difference DP(F) exists on the outside of the target sound existence region 51, the coefficient Sco(F) of existence is set to 0.0.

A coefficient Nco(F) of non-existence at the frequency F is calculated by subtracting the value of the coefficient Sco(F) of existence from 1.0, as illustrated by expression (3).

$$Nco(F)=1.0-Sco(F) \quad (3)$$

The CPU 31 causes a likelihood calculation unit 44 to calculate a first likelihood Sli indicating the likelihood that the voice picked up by the microphone 35A or 35B is a target sound and a second likelihood Nli indicating the likelihood that the voice is a non-target sound. The first likelihood Sli is determined based on an existence value based on a coefficient Sco(f) of existence and a representative value corresponding to one of the frequency signals INFA and INFB. The second likelihood Nli is determined based on a non-existence value based on a coefficient Nco(f) of non-existence and the same representative value as that for calculation of the first likelihood Sli. A case where the first likelihood Sli and the second likelihood Nli are determined based on a representative value corresponding to the frequency signal INFA, that is, an example where the first likelihood Sli and the second likelihood Nli of the voice picked up by the microphone 35A are calculated will be described here.

If an existence value is a coefficient Sco(f) of existence, and a representative value is a power spectrum Po(f) which is the square of an amplitude spectrum Amp(f) of the frequency signal INFA, the first likelihood Sli is calculated, as illustrated by expression (4). That is, the first likelihood Sli is the sum of squares of the respective products of coefficients Sco(f) of existence and power spectra Po(f) from a lower limit frequency fL to an upper limit frequency fH. The lower limit frequency fL may be, for example, 0.3 kHz, and the upper limit frequency fH may be, for example, 3.4 kHz.

$$Sli=\Sigma_{f=fL}^{fH}(Sco(f) \times Po(f))^2 \quad (4)$$

If an existence value is a coefficient Sco(f) of existence, a non-existence value is a coefficient Nco(f) of non-existence, and the second likelihood Nli is calculated, as illustrated by expression (5). A representative value is a power spectrum Po(f) of the frequency signal INFA, like the case of the calculation of the first likelihood Sli. That is, the second likelihood Nli is the sum of squares of the respective products of coefficients Nco(f) of non-existence and the power spectra Po(f) from the lower limit frequency fL to the upper limit frequency fH.

$$Nli=\Sigma_{f=fL}^{fH}(Nco(f) \times Po(f))^2 \quad (5)$$

The CPU 31 causes a non-target sound suppression unit 45 to suppress a non-target sound. If the first likelihood Sli is not less than the second likelihood Nli, the CPU 31 judges that a voice is a target sound and sets a coefficient SNco of suppression to a value which does not suppress the voice signal INTA. On the other hand, if the first likelihood Sli is less than the second likelihood Nli, the CPU 31 judges that the voice is a non-target sound and sets the coefficient SNco of suppression to a value which suppresses the voice signal INTA. The value that does not suppress a voice signal may be 1.0, as illustrated by expression (6). The value that suppresses a voice signal may be 0.1, as illustrated by expression (7).

$$SNco=1.0(Sli \geq Nli) \quad (6)$$

$$SNco=0.1(Sli < Nli) \quad (7)$$

Note that although 0.1 is given as the value that suppresses a voice signal, the present embodiment is not limited to this. The value that suppresses a voice signal may be, for example, 0.2. Instead of judgment based on comparison between the likelihoods as in expressions (6) and (7), the coefficient SNco of suppression may be set to the value that does not suppress a voice signal if the ratio of the first likelihood Sli to the second likelihood Nli is not less than a predetermined value. In this case, the coefficient SNco of suppression may be set to the value that suppresses a voice signal if the ratio of the first likelihood Sli to the second likelihood Nli is less than the predetermined value.

The CPU 31 applies the coefficient SNco of suppression to the voice signal INTA, thereby not suppressing the voice signal INTA if the voice signal INTA is a target sound and suppressing the voice signal INTA if the voice signal INTA is a non-target sound. A power of the voice signal INTA, for example, may be multiplied by the coefficient SNco of suppression. The CPU 31 causes a voice recognition unit 46 to recognize a piece of information included in a voice corresponding to the voice signal INTA by applying an existing voice recognition technique to the voice signal INTA, to which the coefficient SNco of suppression is already applied.

The flow of the action of the voice signal processing device 10 depicted in FIG. 5 will next be described. For example, when a user depresses a process start button of the voice signal processing device 10, the CPU 31 starts a voice signal process. In step 101, the CPU 31 reads a voice signal INTA corresponding to a voice picked up by the microphone 35A and a voice signal INTB corresponding to a voice picked up by the microphone 356. The voice signal INTA and the voice signal INTB are read frame by frame. One frame may be, for example, a voice signal for 20 msec.

In step 102, the CPU 31 converts the voice signals INTA and INTB in time-domain representation to frequency signals INFA and INFB in frequency-domain representation through time-to-frequency conversion. Note that the time-to-frequency conversion is performed on a frame-by-frame basis as described above. In step 103, the CPU 31 calculates, for each frequency, a phase difference DP(f) between the frequency signals INFA and INFB from respective phase components of the frequency signals INFA and INFB. In step 104, the CPU 31 calculates, for each frequency, a coefficient Sco(f) of existence representing the degree of existence of a target sound and a coefficient Nco(f) of non-existence representing the degree of existence of a non-target sound, based on the target sound existence region 51 and the phase difference DP(f) described above.

In step 105, the CPU 31 calculates a first likelihood Sli indicating the likelihood that a voice is a target sound and a second likelihood Nli indicating the likelihood that the voice is a non-target sound. In step 106, the CPU 31 suppresses a non-target sound. If the first likelihood Sli is not less than the second likelihood Nli, the CPU 31 judges that the voice is a target sound and sets a coefficient SNco of suppression to a value which does not suppress a voice signal. On the other hand, if the first likelihood Sli is less than the second likelihood Nli, the CPU 31 judges that the voice is a non-target sound and sets the coefficient SNco of suppression to a value which suppresses the voice signal.

The CPU 31 applies the coefficient SNco of suppression to each frame of the voice signal INTA, and does not suppress the voice signal INTA if the voice signal INTA is a target sound and suppresses the voice signal INTA if the voice signal INTA is a non-target sound. Note that the coefficient SNco of suppression may be applied to the frequency signal INFA and that the frequency signal INFA may then be converted to a voice signal. In step 107, the CPU 31 recognizes a piece of voice information, such as a word, included in the voice corresponding to the voice signal INTA by applying an existing voice recognition technique to the voice signal INTA, to which the coefficient SNco of suppression is already applied. Although an example where voice recognition is performed on a voice signal on a frame-by-frame basis has been described here, the present embodiment is not limited to this. For example, an existing voice recognition technique which is applied to voice signals for a plurality of frames may be used.

In step 108, the CPU 31 judges whether the voice signal process is over by, for example, judging whether a process end button of the voice signal processing device 10 is depressed. If a negative judgment is made in step 108, the CPU 31 returns to step 101. On the other hand, if an affirmative judgment is made in step 108, the CPU 31 ends the voice signal process.

Although an example where the voice signal INTA is used in and after step 104 has been described in the present embodiment, the present embodiment is not limited to this. In and after step 104, the voice signal INTB may be used instead of the voice signal INTA or both of the voice signals INTA and INTB may be used. Note that the two microphones 35A and 35B generally detect a target sound if a voice corresponds to the target sound and detect a non-target sound if a voice corresponds to the non-target sound. Thus, in and after step 104, either one of the voice signals INTA and INTB may be used.

In the present embodiment, although an example where a coefficient of existence is set in the manner depicted in FIG. 4B has been described, the present embodiment is not limited to this. A coefficient of existence may be set in the manner depicted in FIG. 6B. That is, as depicted in FIG. 6A, transition regions 54-1 and 54-2 may be provided on upper and lower sides of and in contact with the target sound existence region 51 for a target sound along a vertical axis representing a phase difference.

Figure 6A:
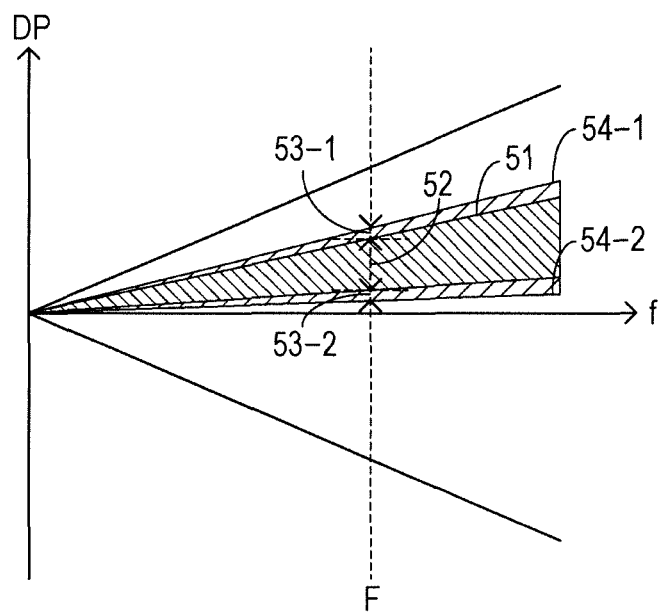
FIG. 6A is a conceptual chart illustrating the target sound existence region.
Figure 6B:
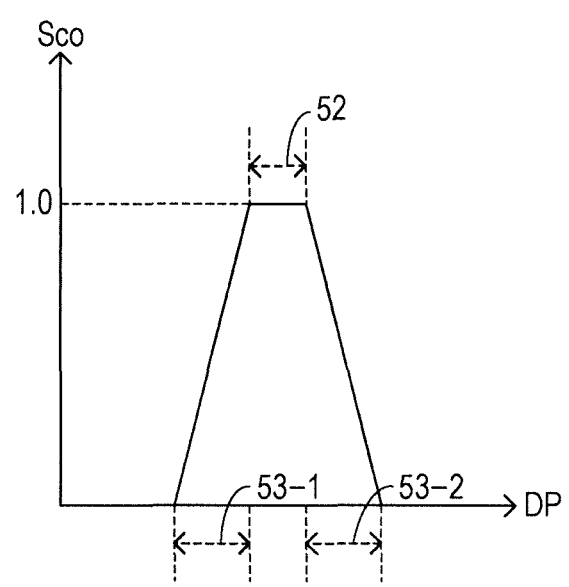
FIG. 6B is a conceptual chart illustrating setting of the coefficient of existence.

FIG. 6B illustrates setting of a coefficient of existence at a frequency F in FIG. 6A. That is, if a phase difference DP(F) calculated based on frequency signals INFA and INFB exists within the phase difference width 52 that is an example of the first range at the frequency F, a coefficient Sco(F) of existence is set to 1.0, as illustrated by expression (1). If the phase difference DP(F) exists on the outside of the phase difference width 52 and phase difference widths 53-1 and 53-2 that is an example of the second range, the coefficient Sco(F) of existence is set to 0.0, as illustrated by expression (2). The phase difference widths 53-1 and 53-2 are an example of a third range.

If the phase difference DP(F) exists within the phase difference width 53-1 or 53-2, the coefficient Sco(F) of existence approaches 1.0 toward the phase difference width 52 and approaches 0.0 away from the phase difference width 52, as depicted in FIG. 6B. Note that FIG. 6B depicts an example and that the coefficient Sco(F) of existence may not increase or decrease linearly in the phase difference widths 53-1 and 53-2.

That is, in the present embodiment, the third range may be provided between the first and second ranges, and a coefficient of existence may be set so as to approach a maximum value toward the first range and approach a minimum value away from the first range, within the third range.

Note that although an example where expression (4) is used to calculate a first likelihood Sli and expression (5) is used to calculate a second likelihood Nli has been described in the present embodiment, the present embodiment is not limited to this. For example, an amplitude spectrum Amp(f)

of a frequency signal INFA may be used as a representative value, as illustrated by expressions (8) and (9).

$$Sli = \sum_{f=fL}^{fH}(Sco(f) \times Amp(f))^2 \quad (8)$$

$$Nli = \sum_{f=fL}^{fH}(Nco(f) \times Amp(f))^2 \quad (9)$$

As illustrated by expression (10), the square of a coefficient Sco(f) of existence may be used as an existence value, and a value obtained by adding up the products of the squares of coefficients Sco(f) of existence and amplitude spectra Amp(f) for respective frequencies may be calculated as a first likelihood Sli. In this case, as illustrated by expression (11), the square of a coefficient Nco(f) of non-existence is used as a non-existence value, and a value obtained by adding up the products of the squares of coefficients Nco(f) of non-existence and the amplitude spectra Amp(f) for the respective frequencies is calculated as a second likelihood Nli.

$$Sli = \sum_{f=fL}^{fH}(Sco(f)^2 \times Amp(f)) \quad (10)$$

$$Nli = \sum_{f=fL}^{fH}(Nco(f)^2 \times Amp(f)) \quad (11)$$

As illustrated by expression (12), among the squares of the products of coefficients Sco(f) of existence and power spectra Po(f) for respective frequencies, a maximum one may be calculated as a first likelihood Sli. In this case, as illustrated by expression (13), among the squares of the products of coefficients Nco(f) of non-existence and power spectra Po(f) for the respective frequencies, a maximum one is calculated as a second likelihood Nli. That is, a coefficient of existence may be used as an existence value, a coefficient of non-existence may be used as a non-existence value, and a power spectrum of a frequency signal may be used as a representative value.

$$Sli = \max(Sco(f) \times Po(f))^2 \quad (12)$$

$$Nli = \max(Nco(f) \times Po(f))^2 \quad (13)$$

As illustrated by expression (14), among the squares of the products of coefficients Sco(f) of existence and amplitude spectra Amp(f) for respective frequencies, a maximum one may be calculated as a first likelihood Sli. In this case, as illustrated by expression (15), among the squares of the products of coefficients Nco(f) of non-existence and the amplitude spectra Amp(f) for the respective frequencies, a maximum one is calculated as a second likelihood Nli. That is, a coefficient of existence may be used as an existence value, a coefficient of non-existence may be used as a non-existence value, and an amplitude spectrum of a frequency signal may be used as a representative value.

$$Sli = \max(Sco(f) \times Amp(f))^2 \quad (14)$$

$$Nli = \max(Nco(f) \times Amp(f))^2 \quad (15)$$

As illustrated by expression (16), among the products of the squares of coefficients Sco(f) of existence and amplitude spectra Amp(f) for respective frequencies, a maximum one may be calculated as the first likelihood Sli. In this case, as illustrated by expression (17), among the products of the squares of coefficients Nco(f) of non-existence and the amplitude spectra Amp(f) for the respective frequencies, a maximum one is calculated as a second likelihood Nli. That is, the square of a coefficient of existence may be used as an existence value, the square of a coefficient of non-existence may be used as a non-existence value, and an amplitude spectrum of a frequency signal may be used as a representative value.

$$Sli = \max(Sco(f)^2 \times Amp(f)) \quad (16)$$

$$Nli = \max(Nco(f)^2 \times Amp(f)) \quad (17)$$

That is, in the present embodiment, a representative value of a frequency signal may be a power spectrum or an amplitude spectrum of the frequency signal. An existence value and a non-existence value may be a coefficient of existence and a coefficient of non-existence, respectively, or the square of a coefficient of existence and the square of a coefficient of non-existence, respectively. Note that expressions (4), (5), and (8) to (17) are illustrative and that the present embodiment is not limited to the expressions.

In the present embodiment, a first likelihood is one of the sum and the sum of the squares of the products of existence values and a representative value for respective predetermined frequencies, and a second likelihood is one on the same side as the selected one of the sum and the sum of the squares of the products of non-existence values and the representative value for the respective predetermined frequencies. Alternatively, the first likelihood is one of a maximum value among the products and a maximum value among the squares of the products of the existence values and the representative value for the respective predetermined frequencies, and the second likelihood is one on the same side as the selected one of a maximum value among the products and a maximum value among the squares of the products of the non-existence values and the representative value for the respective predetermined frequencies.

Note that although an example where voice recognition is performed on a voice signal INTA, to which a coefficient SNco of suppression is already applied, has been described in the present embodiment, the present embodiment is not limited to this. For example, if the present embodiment is applied to a voice monitor of an elderly person living alone, the presence or absence of a target sound may be checked by judging whether the total of sound pressures for a predetermined time of a target sound included in a voice signal INTA has exceeded a predetermined value. In execution of voice recognition allows protection of the privacy of an object to be monitored. In the present embodiment, a cough, the sound of a door being opened or closed, the sound of running tap water, and the like may be judged by performing sound (excluding voice) recognition processing instead of voice recognition processing. Thus, the voice signal processing according to the present embodiment includes acoustic signal processing.

In the present embodiment, a first voice signal corresponding to a first voice input from a first voice input unit is converted to a first frequency signal through time-to-frequency conversion, and a second voice signal corresponding to a second voice input from a second voice input unit is converted to a second frequency signal through the time-to-frequency conversion. A coefficient of existence representing degree of existence of a target sound and a coefficient of non-existence representing degree of existence of a non-target sound other than the target sound are set for each of predetermined frequencies based on a phase difference for each of the predetermined frequencies between the first frequency signal and the second frequency signal and a target sound existence region indicating an existence position of the target sound. The target sound is a voice serving as an object to be detected. It is judged whether the target sound is included in the first and second voices, based on a first likelihood indicating a likelihood that the first voice or the second voice is the target sound and a second likelihood indicating a likelihood that the first voice or the second voice is the non-target sound. The first likelihood is determined based on an existence value based on the coefficient of existence and a representative value corresponding to either one of the first and second frequency signals, and the second likelihood is determined based on a non-existence value based on the coefficient of non-existence and the representative value.

In the present embodiment with the above-described configuration, a target sound may be appropriately judged even under an environment where a target sound and a non-target sound are co-resident and a voice is likely to reflect. That is, a target sound may be appropriately judged even under an environment which is a narrow place, such as an automobile interior or a private room for single life, and in which a phase difference between voices acquired by the two voice input units tends to be unsteady due to ease of voice reflection.

In the present embodiment, it is judged, based on the first and second likelihoods, whether the non-target sound is included in the first and second voices.

In the present embodiment, the coefficient of existence is set for each of the predetermined frequencies so as to have a maximum value if the phase difference is within a first range corresponding to the target sound existence region and have a minimum value if the phase difference is within a second range outside the first range, and a value obtained by subtracting the coefficient of existence from the maximum value is set as the coefficient of non-existence.

In the present embodiment, a coefficient of suppression that does not suppress a voice signal is set if the first likelihood is not less than the second likelihood, and a coefficient of suppression that suppresses a voice signal is set if the first likelihood is less than the second likelihood. The set coefficient of suppression is applied to at least one of the first and second voice signals.

In the present embodiment, voice recognition is performed on the at least one of the first and second voice signals, to which the coefficient of suppression is already applied.

[Second Embodiment]

An example of a second embodiment will next be described. A description of the same configuration and action as those in the first embodiment will be omitted. The second embodiment is different from the first embodiment in a method for setting a coefficient of suppression in non-target sound suppression processing.

FIG. 7 depicts an example of a voice signal process according to the second embodiment. Step 106 in FIG. 5 that is an example of the voice signal process according to the first embodiment is replaced with step 114. Note that, in the present embodiment, first likelihoods Sli and second likelihoods Nli for a plurality of frames are used for coefficient-of-suppression setting and that steps 111, 112, and 113 are added.

In step 111, a CPU 31 sets a variable t to an initial value of 1. The variable t is a variable for counting the number of frames. Steps 101 to 105 are described above, and a description thereof will be omitted. The CPU 31 adds 1 to the variable t in step 112 and judges in step 113 whether the variable t has exceeded a predetermined frame number T. If a negative judgment is made in step 113, the CPU 31 returns to step 101. On the other hand, if an affirmative judgment is made in step 113, the CPU 31 advances to step 114. In this manner, the CPU 31 calculates the predetermined frame number T of first likelihoods Sli and second likelihoods Nli before advancing to step 114. The predetermined frame number T may be, for example, 512. A first likelihood Sli corresponding to each frame is denoted by Sli(t), and a second likelihood Nli corresponding to each frame is denoted by Nli(t).

For voice recognition processing in step 107, steps 115, 116, and 117 are added to perform voice recognition processing on the predetermined frame number T of parts of a voice signal INTA. Steps 115, 116, and 117 are the same as steps 111, 112, and 113, and a description thereof will be omitted. Steps 107 and 108 are described above, and a description thereof will be omitted.

FIG. 8 illustrates the details of a non-target sound suppression process according to the present embodiment illustrated by step 114 of FIG. 7. In step 201, the CPU 31 sets the variable t for counting the number of frames to 1. In step 202, the CPU 31 judges whether a first likelihood Sli(t) is not less than a second likelihood Nli(t). If an affirmative judgment is made in step 202, since a voice corresponding to the first likelihood Sli(t) and the second likelihood Nli(t) is highly likely to be a target sound, the CPU 31 sets a variable SNR representing the possibility of a target sound to 1.0 in step 203.

On the other hand, if a negative judgment is made in step 202, since the voice corresponding to the first likelihood Sli(t) and the second likelihood Nli(t) may not be a target sound, the CPU 31 sets the variable SNR to a value illustrated by expression (18) in step 205. Expression (18) sets the ratio of the first likelihood Sli(t) to the second likelihood Nli(t) as the variable SNR.

$$SNR = Sli(t)/Nli(t) \quad (18)$$

Figure 9A:
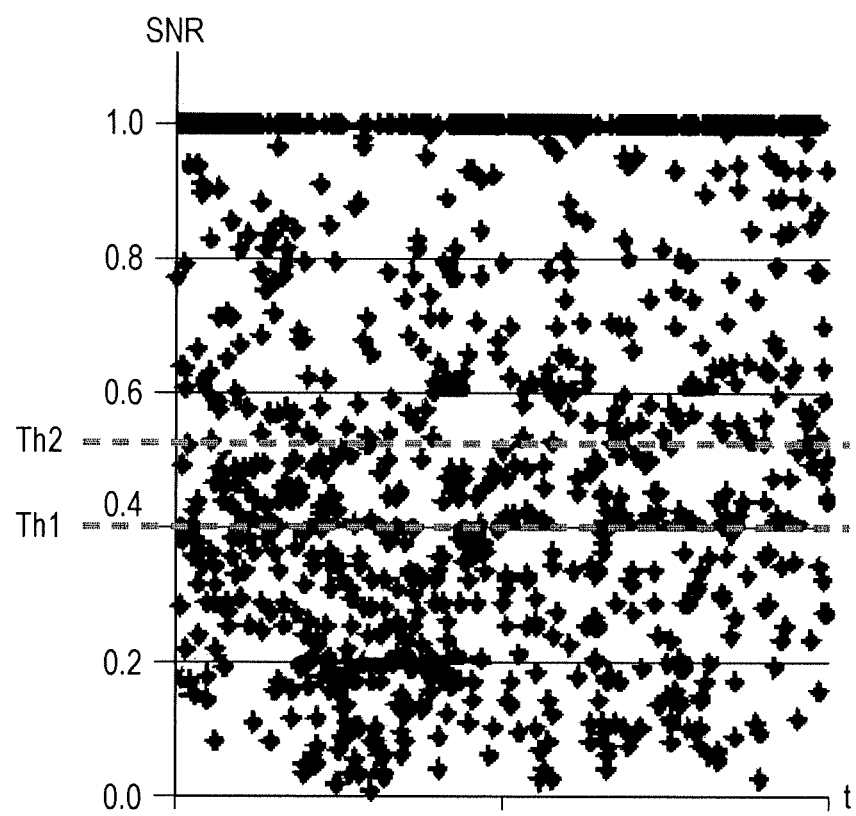
FIG. 9A is an illustrative conceptual chart for explaining a process of setting a coefficient of suppression.
Figure 9B:
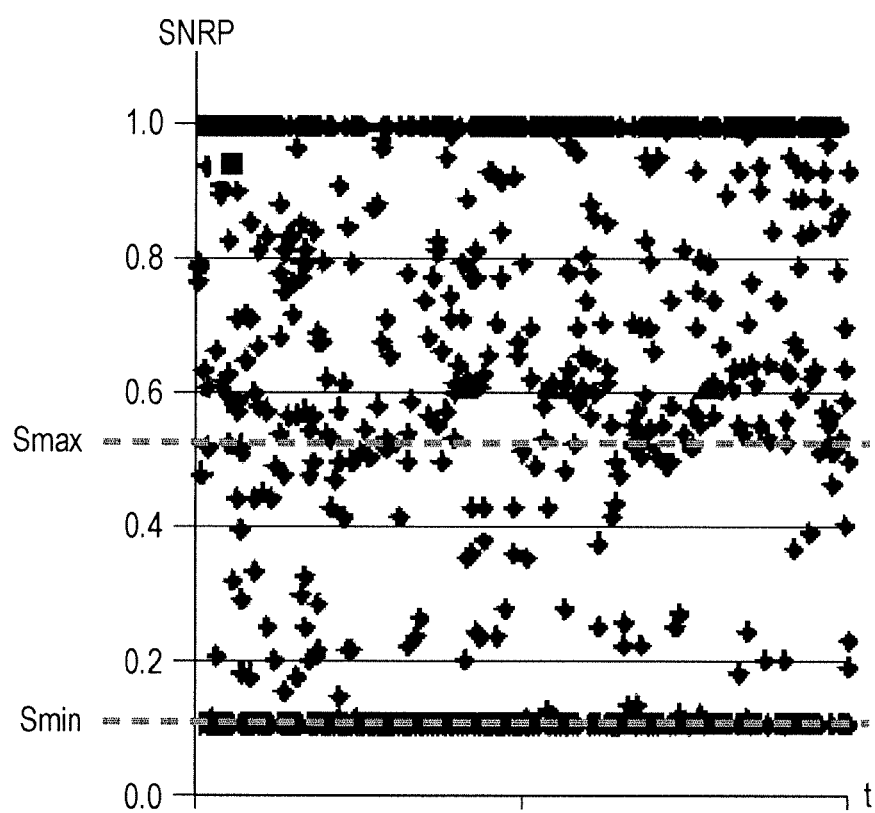
FIG. 9B is an illustrative conceptual chart for explaining the process of setting the coefficient of suppression.

FIG. 9A illustrates a chart with dots indicating values of the variable SNR for respective frames. The vertical axis in FIG. 9A represents a value of the variable SNR while the horizontal axis represents the variable t for counting the number of frames. In steps 204 and 206 to 210, values of the variable SNR between a first threshold Th1 and a second threshold Th2 in FIG. 9A are scattered between a minimum scattering value Smin and a maximum scattering value Smax, as illustrated in FIG. 9B. Values above the second threshold Th2 of the variable SNR are not changed, and values below the first threshold Th1 of the variable SNR are made to converge on the minimum scattering value Smin. A zone between the first threshold Th1 and the second threshold Th2 in FIG. 9A functions as a buffer zone at the time of judging whether a corresponding voice is a target sound or a non-target sound.

In step 204, the CPU 31 sets a variable SNRP(t) to the value of 1.0 set in the variable SNR in step 203. The value of 1.0 set in the variable SNR is more than the second threshold Th2 and is not changed. Note that steps 203 and 204 are separately provided for explanation but the variable SNRP(t) may be directly set to 1.0.

In step 206, the CPU 31 judges whether the value of the variable SNR is more than the second threshold Th2. If an affirmative judgment is made, the CPU 31 sets the variable SNRP(t) to the value of the variable SNR without change in step 207. The value of the variable SNR is more than the second threshold Th2 and is not changed.

If a negative judgment is made in step 206, the CPU 31 judges in step 208 whether the value of the variable SNR is less than the first threshold Th1. If an affirmative judgment is made in step 208, the CPU 31 sets the variable SNRP(t) to the minimum scattering value Smin in step 209.

If a negative judgment is made in step 208, that is, the value of the variable SNR is within the buffer zone, the CPU 31 scatters the variable SNR by, for example, setting the variable SNRP(t) to a value calculated by expression (19) in step 210.

$$SNRP(t)=(SNR-Th1)(Smax-Smin)/(Th2-Th1)+Smin \quad (19)$$

FIG. 9B illustrates a chart with dots indicating values of a variable SNRP for respective frames. The vertical axis in FIG. 9B represents a value of the variable SNRP while the horizontal axis represents the variable t for counting the number of frames. Note that one dot alone exists at one time (one frame) on a time axis (the horizontal axis), which is hard to understood due to many dots plotted in FIGS. 9A and 9B.

The first threshold Th1, the second threshold Th2, the minimum scattering value Smin, and the maximum scattering value Smax may be set to appropriate values such that Th2−Th1<Smax−Smin holds. Although an example where values of the variable SNR are uniformly scattered between the minimum scattering value Smin and the maximum scattering value Smax has been described with reference to expression (19), the present embodiment is not limited to this.

Figure 9C:
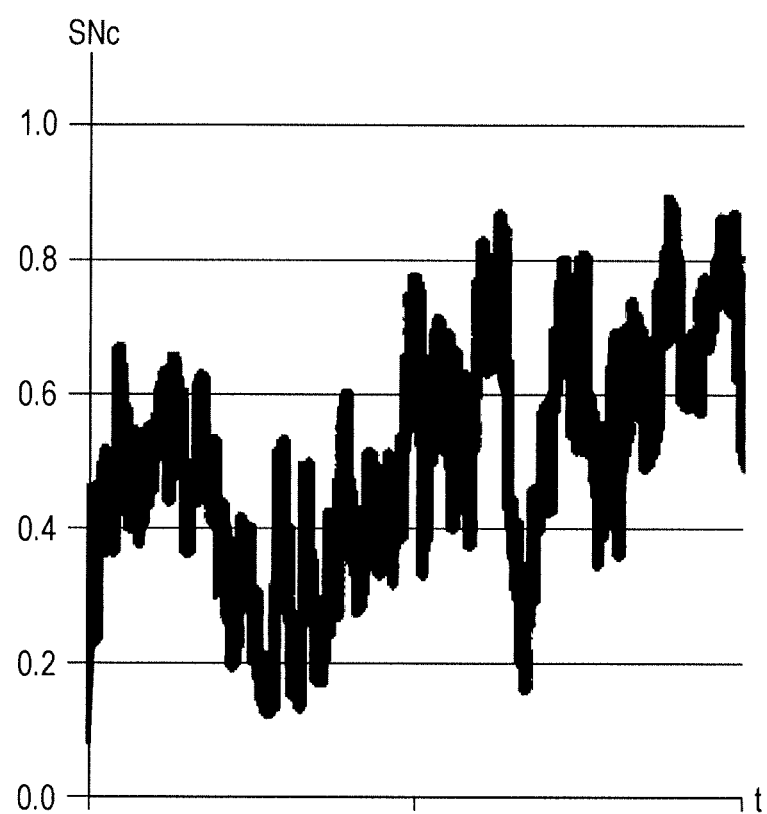
FIG. 9C is an illustrative conceptual chart for explaining the process of setting the coefficient of suppression.

The CPU 31 adds 1 to the variable t in step 211 and judges in step 212 whether the value of the variable t has exceeded the predetermined frame number T. If a negative judgment is made in step 212, the CPU 31 returns to step 202. On the other hand, if an affirmative judgment is made in step 212, the CPU 31 acquires a coefficient SNc(t) of suppression by suppressing variation in the value set in each variable SNRP(t) per unit time in step 213. To suppress variation per unit time, for example, a low-pass filter is applied to each variable SNRP(t). That is, the values of T variables SNRP(t) calculated in the processes in steps 201 to 212 in FIG. 8 are temporarily stored in a memory. In steps 213 to 217, the value of each variable SNRP(t) is applied, as the coefficient SNc(t) of suppression, to a piece of voice data while sequentially reading the values and, if there is a rapid change between the values of the previous variable SNRP(t) and the variable SNRP(t) this time, correcting the read value such that the change is suppressed. FIG. 9C illustrates a chart of each coefficient SNc(t) of suppression (t=1 to T) that is acquired as a result of applying the low-pass filter to the variable SNRP(t) (t=1 to T) in FIG. 9B. The vertical axis in FIG. 9C represents a coefficient SNc of suppression while the horizontal axis represents the variable t for counting the number of frames.

The CPU 31 sets the variable t representing the current frame number to a value of 1 in step 214. The CPU 31 applies the coefficient SNc(t) of suppression to a voice signal INTA(t) for a corresponding frame in step 215. For example, the CPU 31 multiplies a power of the voice signal INTA(t) for the corresponding frame by the value of the coefficient SNc(t) of suppression.

The CPU 31 adds 1 to the variable t in step 216 and judges in step 217 whether the value of the variable t has exceeded the predetermined frame number T. If a negative judgment is made in step 217, the CPU 31 returns to step 215. On the other hand, if an affirmative judgment is made in step 217, the CPU 31 ends the non-target sound suppression process.

In the present embodiment, a first voice signal corresponding to a first voice input from a first voice input unit is converted to a first frequency signal through time-to-frequency conversion, and a second voice signal corresponding to a second voice input from a second voice input unit is converted to a second frequency signal through the time-to-frequency conversion. A coefficient of existence representing degree of existence of a target sound and a coefficient of non-existence representing degree of existence of a non-target sound other than the target sound are set for each of predetermined frequencies based on a phase difference for each of the predetermined frequencies between the first frequency signal and the second frequency signal, and a target sound existence region indicating an existence position of the target sound. The target sound is a voice serving as an object to be detected. It is judged whether the target sound is included in the first and second voices, based on a first likelihood indicating a likelihood that the first voice or the second voice is the target sound and a second likelihood indicating a likelihood that the first voice or the second voice is the non-target sound. The first likelihood is determined based on an existence value based on the coefficient of existence and a representative value corresponding to either one of the first and second frequency signals, and the second likelihood is determined based on a non-existence value based on the coefficient of non-existence and the representative value.

In the present embodiment with the above-described configuration, a target sound may be appropriately extracted even under an environment where a target sound and a non-target sound are co-resident and a voice is likely to reflect.

In the present embodiment, a coefficient of suppression that does not suppress a voice signal is set if the first likelihood is not less than the second likelihood, a coefficient of suppression that suppresses a voice signal is set if the first likelihood is less than the second likelihood. The set coefficient of suppression is applied to at least one of the first and second voice signals.

In the present embodiment, the coefficient of suppression is set based on a ratio of the first likelihood to the second likelihood. In the present embodiment, variation in the coefficient of suppression per unit time is suppressed.

For this reason, in the present embodiment, a coefficient of suppression that appropriately suppresses a non-target sound may be set even under an environment where a target sound and a non-target sound are co-resident and a voice is likely to reflect.

[Third Embodiment]

Figure 10:
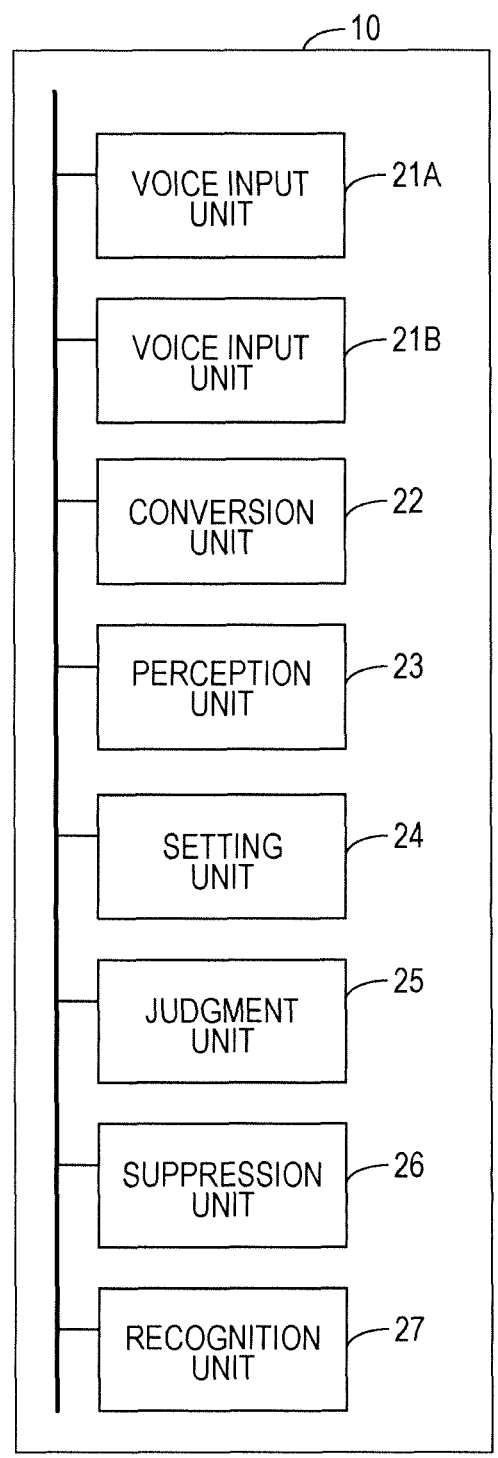
FIG. 10 is a block diagram depicting an example of main functions in a voice signal processing device according to a third embodiment.

An example of a third embodiment will next be described. A description of the same configuration and action as those in the first or second embodiment will be omitted. As illustrated in FIG. 10, the third embodiment is different from the first and second embodiments in that a perception unit 23 is added.

In the first embodiment, a target sound existence position is known in advance, and the target sound existence region 51 is determined based on the target sound existence position and the positions of the microphones 35A and 35B, as illustrated in FIG. 4A or 6A. In contrast, an example where a target sound existence position may move will be described in the present embodiment.

Figure 11:
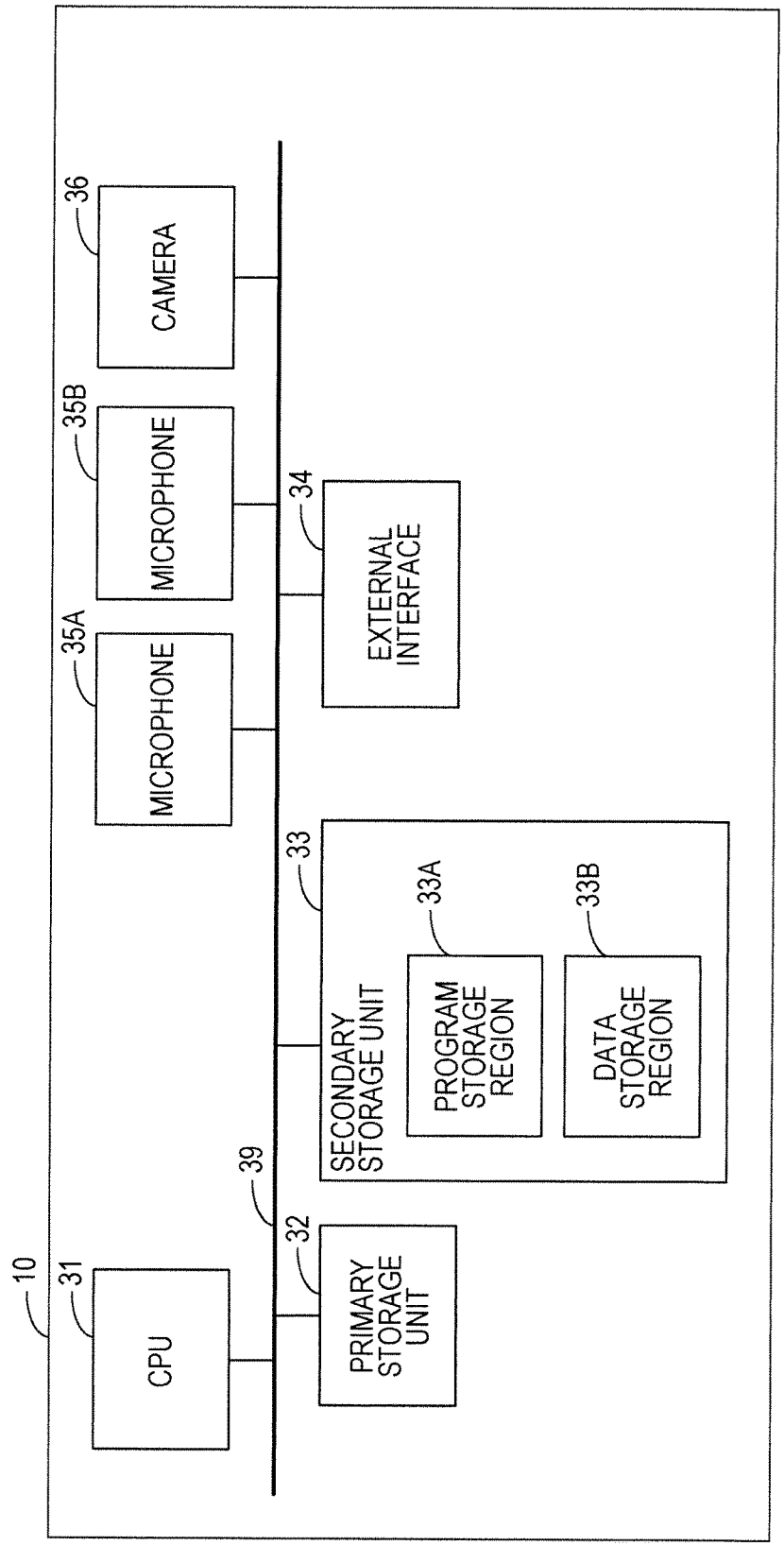
FIG. 11 is a block diagram depicting an example of the hardware configuration of the voice signal processing device according to the third embodiment.
Figure 12:
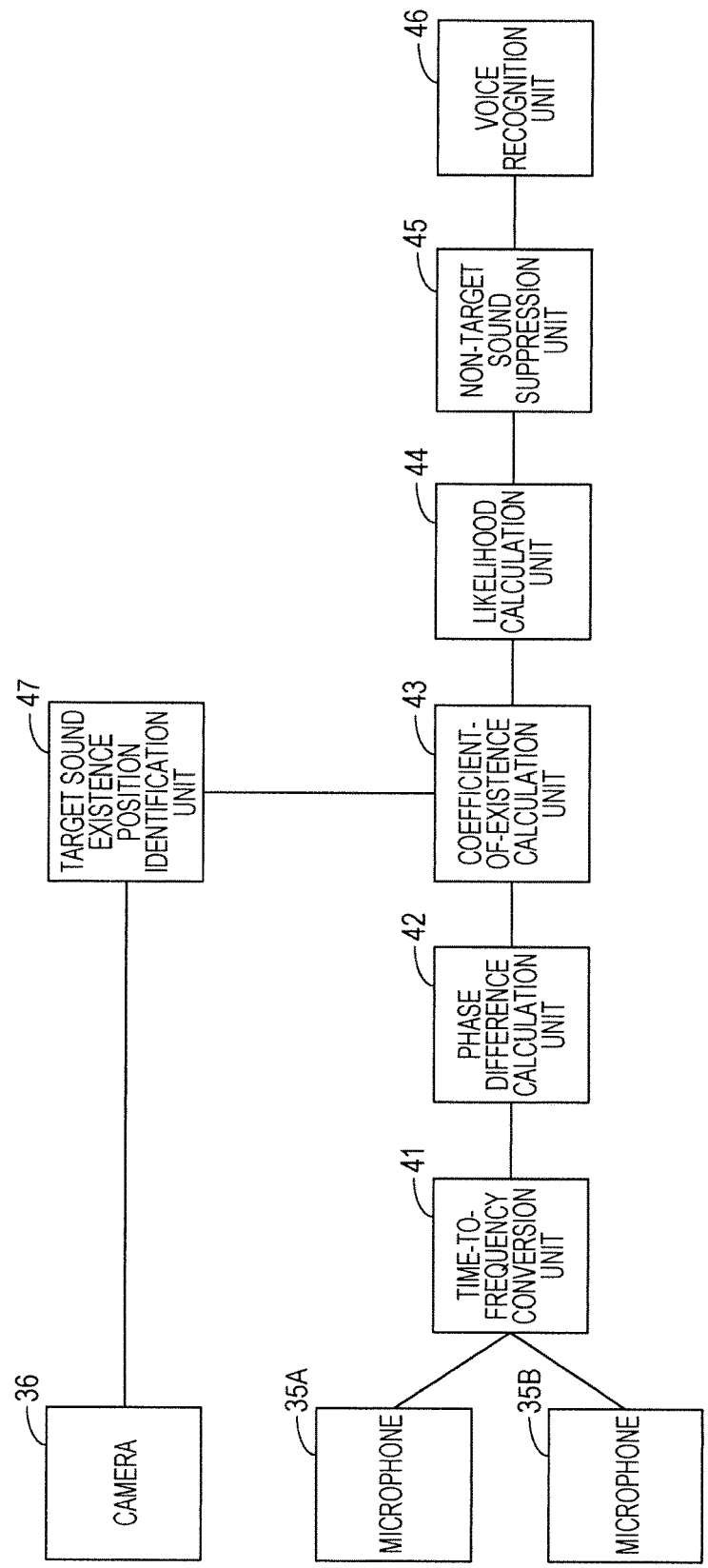
FIG. 12 is a conceptual diagram for explaining the outline of a voice signal process according to the third embodiment.

As illustrated in FIG. 11, the perception unit 23 may be, for example, a camera 36. As illustrated in FIG. 12, a CPU 31 acquires an image by shooting using the camera 36. The CPU 31 causes a target sound existence position identification unit 47 to dynamically identify a target sound existence position by applying an existing image processing technique to the acquired image and determine a target sound existence region 51 based on the identified existence position and the positions of microphones 35A and 35B. The existing image processing technique may be, for example, a face recognition technique or the like. A target sound existence position (that is, the position of a mouth of a user) may be identified by recognizing a face of the user.

Figure 13:
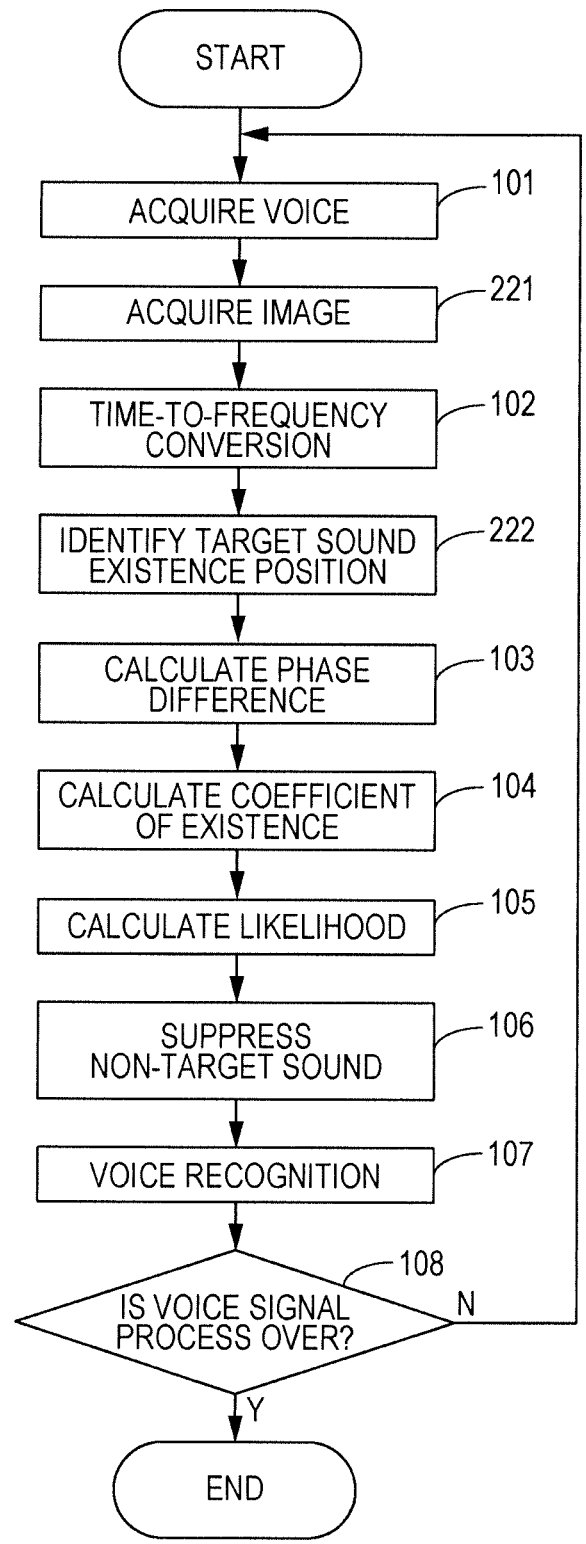
FIG. 13 is a flowchart depicting an example of the flow of the voice signal process according to the third embodiment.

The flow of the action of a voice signal processing device 10 illustrated in FIG. 13 will next be described. A voice signal process illustrated in FIG. 13 is different from that in the first embodiment in that steps 221 and 222 are added. The CPU 31 acquires an image using the camera 36 in step 221, and identifies a target sound existence position through recognition of the acquired image and determines the target sound existence region 51 using the identified existence position in step 222. Steps 101 to 108 are described above, and a description thereof will be omitted.

Note that although an example where the camera 36 is used as the perception unit 23 has been described in the present embodiment, the present embodiment is not limited to this. The perception unit 23 may be, for example, an infrared ray sensor or a temperature sensor. A target sound existence position may be identified based on heat generated by a user. The perception unit 23 may be a sensor which detects a predetermined signal. For example, a target sound existence position may be identified by a user wearing a wearable terminal which generates a predetermined signal.

In the present embodiment, a first voice signal corresponding to a first voice input from a first voice input unit is converted to a first frequency signal through time-to-frequency conversion, and a second voice signal corresponding to a second voice input from a second voice input unit is converted to a second frequency signal through the time-to-frequency conversion. A coefficient of existence representing degree of existence of a target sound and a coefficient of non-existence representing degree of existence of a non-target sound other than the target sound are set for each of predetermined frequencies based on a phase difference for each of the predetermined frequencies between the first frequency signal and the second frequency signal and a target sound existence region indicating an existence position of the target sound. The target sound is a voice serving as an object to be detected. It is judged whether the target sound is included in the first and second voices, based on a first likelihood indicating a likelihood that the first voice or the second voice is the target sound and a second likelihood indicating a likelihood that the first voice or the second voice is the non-target sound. The first likelihood is determined based on an existence value based on the coefficient of existence and a representative value corresponding to either one of the first and second frequency signals, and the second likelihood is determined based on a non-existence value based on the coefficient of non-existence and the representative value.

In the present embodiment with the above-described configuration, a target sound may be appropriately judged even under an environment where a target sound and a non-target sound are co-resident and reflection is likely to occur.

In the present embodiment, the existence position of the target sound is perceived, and the target sound existence region is determined based on the perceived existence position.

For this reason, in the present embodiment, even if a target sound existence position moves under an environment where a target sound and a non-target sound are co-resident and reflection is likely to occur, a coefficient of existence may be appropriately set, which allows appropriate judgment of a target sound. That is, a perception unit is not desired, for example, if a user is seated at a predetermined position, such as a driver's seat, or is seated at a fixed position, such as a sofa in the living room. However, for example, if a user is listening to the radio or watching TV while doing household chores in the living room, provision of a perception unit which identifies a target sound existence position is useful.

Note that the flowcharts in FIGS. 5, 7, 8, and 13 are illustrative and that the order of processes may be appropriately changed.

[Verification Example]

Figures 14A, 14B, 14C:
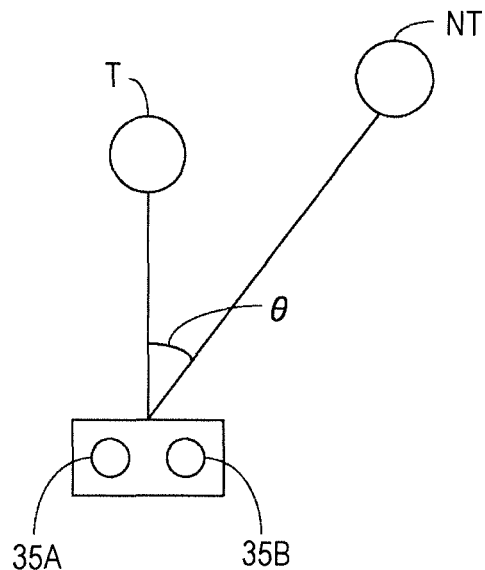
FIG. 14A is a conceptual diagram illustrating a condition for a verification according to the embodiments.
FIG. 14B is a table illustrating a result of the verification according to the embodiments.
FIG. 14C is a table illustrating a result of the verification according to the embodiments.

FIGS. 14B and 14C illustrate detection rates and false detection rates when voice recognition is performed on voice signals, non-target sounds of which are suppressed by applying voice signal processing according to the present disclosure and voice signal processing according to related art, under a condition illustrated in FIG. 14A. In FIG. 14A, a target sound existence position T is at a position 1.5 m in front of a microphone array including the microphones 35A and 35B, and a non-target sound existence position NT is at a position 2.5 m in front of the microphone array. A line connecting the target sound existence position T and the microphone array and a line connecting the non-target sound existence position NT and the microphone array intersect at an angle θ of 40 degrees.

A detection rate is the ratio of the number of words correctly detected to the number of words to be detected, as illustrated by expression (20). A false detection rate is the ratio of the number of words erroneously detected to the number of words detected, as illustrated by expression (21).

$$\text{Detection rate} = \text{the number of words correctly detected/the number of words to be detected} \quad (20)$$

$$\text{False detection rate} = \text{the number of words erroneously detected/the number of words detected} \quad (21)$$

As illustrated in FIG. 14B, a detection rate for related art RA is 93.5% that is the same as that for the present disclosure PA if a voice includes a target sound alone, but if a voice includes a target sound and a non-target sound, the detection rate decreases to 83.9%. In contrast, a detection rate for the present disclosure PA is 91.5% even if a voice includes a target sound and a non-target sound, and a detection rate higher than that for the related art RA is maintained.

As illustrated in FIG. 14C, false detection rates for the related art RA and the present disclosure PA are both 0.0% if a voice includes a target sound alone, but the false detection rate for the related art RA increases to 16.4% if a voice includes a target sound and a non-target sound. In contrast, the false detection rate for the present disclosure PA remains at 0.0% even if a voice includes a target sound and a non-target sound. The false detection rate for the related art RA increases to 52.5% if a voice includes a non-target sound alone while the false detection rate for the present disclosure PA remains as low as 1.6%. That is, the present disclosure PA allows maintenance of a detection rate at a high value and maintenance of a false detection rate at a low value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable non-transitory storage medium storing a program for causing a computer to execute a voice signal process, the process comprising:
converting a first voice signal corresponding to a first voice input from a first microphone to a first frequency signal through time-to-frequency conversion and converting a second voice signal corresponding to a second voice input from a second microphone to a second frequency signal through time-to-frequency conversion;
setting a coefficient of existence representing degree of existence of a target sound serving as an object to be detected and a coefficient of non-existence representing degree of existence of a non-target sound other than the target sound for each of predetermined frequencies based on a phase difference for each of the predetermined frequencies between the first frequency signal and the second frequency signal and a target sound existence region indicating an existence position of the target sound;
calculating a first likelihood that is determined based on an existence value based on the coefficient of existence and a representative value corresponding to either one of the first frequency signal and the second frequency signal and indicates a likelihood that the first voice or the second voice is the target sound, and a second likelihood that is determined based on a non-existence value based on the coefficient of non-existence and the representative value and indicates a likelihood that the first voice or the second voice is the non-target sound;
judging whether or not at least one of the first voice and the second voice includes the target sound, based on the first likelihood and the second likelihood; and
in response to at least one of the first voice and the second voice being judged to not include the target sound,
setting a coefficient of suppression for suppressing the at least one of the first voice and the second voice judged to not include the target sound, and
applying the set coefficient of suppression to the at least one of the first voice and the second voice judged to not include the target sound.

2. The storage medium according to claim 1, wherein the process further comprising:
judging whether or not at least one of the first voice and the second voice includes the non-target sound, based on the first likelihood and the second likelihood; and
in response to at least one of the first voice and the second voice being fudged to include the non-target sound,
setting a coefficient of suppression for suppressing the at least one of the first voice and the second voice judged to include the non-target sound, and
applying the set coefficient for suppression to the at least one of the first voice and the second voice judged to include the non-target sound.

3. The storage medium according to claim 1, wherein in the setting a coefficient of existence,
setting, for each of the predetermined frequencies, the coefficient of existence such that the coefficient of existence has a maximum value if the phase difference is within a first range corresponding to the target sound existence region and has a minimum value if the phase difference is within a second range outside the first range, and
setting a value obtained by subtracting the coefficient of existence from the maximum value as the coefficient of non-existence.

4. The storage medium according to claim 3, wherein in the setting a coefficient of existence,
providing a third range between the first range and the second range, and
setting the coefficient of existence such that the coefficient of existence approaches the maximum value toward the first range and approaches the minimum value away from the first range, within the third range.

5. The storage medium according to claim 1, wherein
the representative value is a power spectrum or an amplitude spectrum of the either one of the first frequency signal and the second frequency signal, and
the existence value is the coefficient of existence and the non-existence value is the coefficient of non-existence, or the existence value is a square of the coefficient of existence and the non-existence value is a square of the coefficient of non-existence.

6. The storage medium according to claim 5, wherein
the first likelihood is one of a sum of products and a sum of squares of the products of the existence values and the representative value for the respective predetermined frequencies, and the second likelihood is one on a same side as the selected one of a sum of products and a sum of squares of the products of the non-existence values and the representative value for the respective predetermined frequencies, or
the first likelihood is one of a maximum value among products and a maximum value among squares of the products of the existence values and the representative value for the respective predetermined frequencies, and the second likelihood is one on a same side as the selected one of a maximum value among products and a maximum value among squares of the products of the non-existence values and the representative value for the respective predetermined frequencies.

7. The storage medium according to claim 1, wherein
the predetermined frequencies are determined based on frequency resolutions of the first and second frequency signals obtained through the time-to-frequency conversion.

8. The storage medium according to claim 1, wherein
a distance between the first microphone and the second microphone is a distance which causes a phase difference between the first frequency signal and the second frequency signal if a distance between the existence position of the target sound and the first voice input unit is different from a distance between the existence position of the target sound and the second voice input unit or if a distance between an existence position of the non-target sound and the first voice input unit is different from a distance between the existence position of the non-target sound and the second voice input unit.

9. The storage medium according to claim 1, wherein:
the judging judges that a voice includes the target sound when the first likelihood is not less than the second likelihood, and judges that the voice does not include the target sound when the first likelihood is less than the second likelihood.

10. The storage medium according to claim 9, wherein
the coefficient of suppression is set based on a ratio of the first likelihood to the second likelihood.

11. The storage medium according to claim 9, wherein, in the setting the coefficient of suppression, a variation in the coefficient of suppression per unit time is suppressed.

12. The storage medium according to claim 9, wherein the process further comprising:
performing voice recognition on at least one of the first and second voice signals, to which the coefficient of suppression is already applied.

13. The storage medium according to claim 1, wherein the process further comprising:
perceiving the existence position of the target sound by a perception device, and
determining the target sound existence region based on the perceived existence position.

14. A voice signal processing method, the method causing a computer to execute:
converting a first voice signal corresponding to a first voice input from a first microphone to a first frequency signal through time-to-frequency conversion and converting a second voice signal corresponding to a second voice input from a second microphone to a second frequency signal through time-to-frequency conversion;
setting a coefficient of existence representing degree of existence of a target sound serving as an object to be detected and a coefficient of non-existence representing degree of existence of a non-target sound other than the target sound for each of predetermined frequencies based on a phase difference for each of the predetermined frequencies between the first frequency signal and the second frequency signal and a target sound existence region indicating an existence position of the target sound;
judging whether or not at least one of the first voice and the second voice includes the target sound, based on a first likelihood that is determined based on an existence value based on the coefficient of existence and a representative value corresponding to either one of the first frequency signal and the second frequency signal and indicates a likelihood that the first voice or the second voice is the target sound, and a second likelihood that is determined based on a non-existence value based on the coefficient of non-existence and the representative value and indicates a likelihood that the first voice or the second voice is the non-target sound;
in response to at least one of the first voice and the second voice being judged to not include the target sound,
setting a coefficient of suppression for suppressing the at least one of the first voice and the second voice judged to not include the target sound, and
applying the set coefficient of suppression to the at least one of the first voice and the second voice judged to not include the target sound.

15. A voice signal processing device comprising:
a memory, and
a processor coupled to the memory and configured to execute a process comprising:
converting a first voice signal corresponding to a first voice input from a first microphone to a first frequency signal through time-to-frequency conversion and convert a second voice signal corresponding to a second voice input from a second microphone to a second frequency signal through the time-to-frequency conversion;
setting a coefficient of existence representing degree of existence of a target sound serving as an object to be detected and a coefficient of non-existence representing degree of existence of a non-target sound other than the target sound for each of predetermined frequencies based on a phase difference for each of the predetermined frequencies between the first frequency signal and the second frequency signal and a target sound existence region indicating an existence position of the target sound; and
judging whether or not at least one of the first voice and the second voice includes the target sound, based on a first likelihood that is determined based on an existence value based on the coefficient of existence and a representative value corresponding to either one of the first frequency signal and the second frequency signal and indicates a likelihood that the first voice or the second voice is the target sound and a second likelihood that is determined based on a non-existence value based on the coefficient of non-existence and the representative value and indicates a likelihood that the first voice or the second voice is the non-target sound;
in response to at least one of the first voice and the second voice being judged to not include the target sound,
setting a coefficient of suppression for suppressing the at least one of the first voice and the second voice judged to not include the target sound, and
applying the set coefficient of suppression to the at least one of the first voice and the second voice judged to not include the target sound.

\* \* \* \* \*